C. C. ROSS.
GATE LATCH.
APPLICATION FILED JAN. 3, 1919.

1,312,051. Patented Aug. 5, 1919.

Witness

Inventor,
C. C. Ross
By C. A. Snow & Co.
Attorneys.

UNITED STATES PATENT OFFICE.

CHARLEY CLIFFTON ROSS, OF SPRINGFIELD, MISSOURI.

GATE-LATCH.

1,312,051. Specification of Letters Patent. Patented Aug. 5, 1919.

Application filed January 3, 1919. Serial No. 269,445.

*To all whom it may concern:*

Be it known that I, CHARLEY CLIFFTON ROSS, a citizen of the United States, residing at Springfield, in the county of Greene and State of Missouri, have invented a new and useful Gate-Latch, of which the following is a specification.

The device forming the subject matter of this application is of that general construction shown in a Patent No. 1,279,162 granted to me on September 17, 1918, for sundry improvements in a gate latch. In that patent, a T-shaped member on a gate coöperates with a loop-shaped keeper journaled on a post, to hold the gate closed. This application aims to provide a novel guard coacting with the T-shaped member and the keeper, to maintain these parts interlocked.

Within the scope of what is claimed, a mechanic may make changes, without departing from the spirit of the invention.

Figure 1:
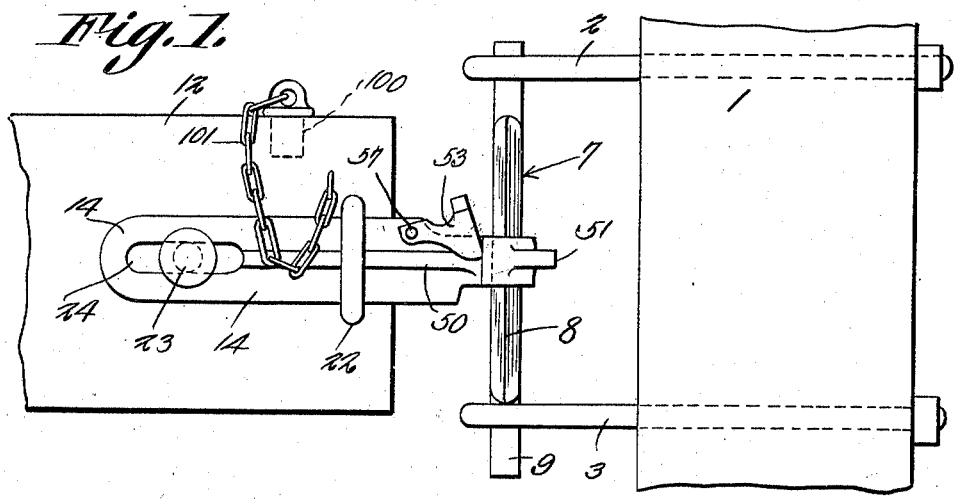
Figure 2:
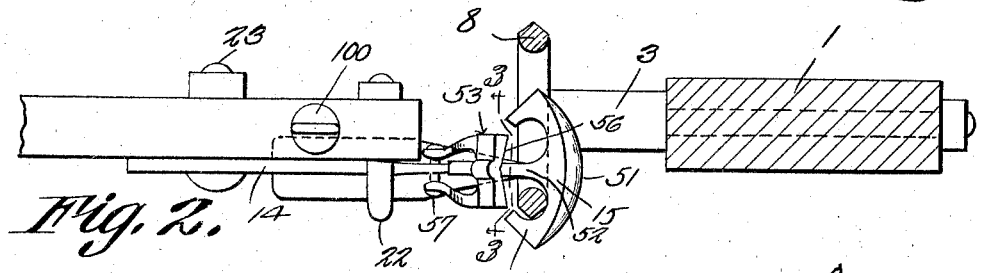
Figures 3, 4:
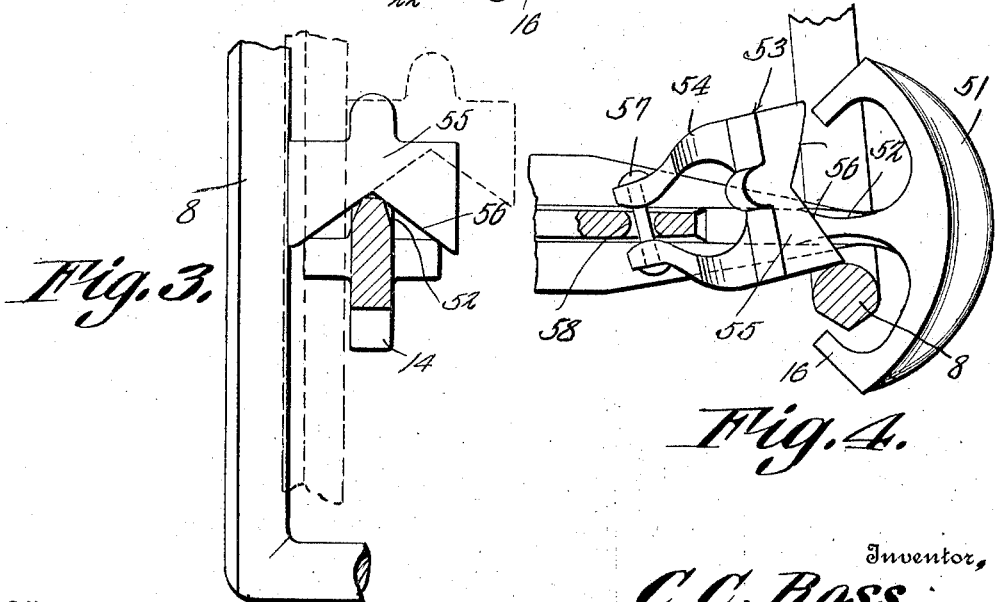

In the drawings: Figure 1 shows in side elevation, a device constructed in accordance with the invention; Fig. 2 is a top plan wherein parts are sectioned, the securing chain for the filler being omitted; Fig. 3 is a cross section taken approximately on the line 3—3 of Fig. 2; and Fig. 4 is a fragmental top plan showing how the guard operates, parts being in section.

Passing with a somewhat cursory notice those parts which are shown in my patent above identified, it may be stated that the drawings disclose a gate post 1 carrying an upper support 2 and a lower support 3. The numeral 7 marks a loop-shaped keeper including side bars 8 and spindles 9, the latter elements being journaled in the supports 2 and 3. The numeral 12 denotes a gate, and a latch is carried by the gate, the latch being of T-shape and including a shank 14 and a transverse head 15 having arms 16 which project inwardly toward the shank. The shank of the latch may be attached to the gate 12 in any desired way, for instance, by means of a U bolt 22 and a bolt 23, the latter element being mounted for adjustment in a slot 24 formed in the shank of the latch, it being possible to adjust the latch toward and away from the keeper 7 so that the head 15 of the latch may coöperate with the keeper in a way to be pointed out hereinafter. The general operation of a device of this sort is well understood, but, referring to Fig. 2, it will be understood that when the gate 12 is swung to a closed position, the head 15 of the latch tilts the keeper 7, one of the side bars 8 ultimately being engaged behind one of the arms 16 of the keeper, when the keeper is rotated by engagement with the shank 14. At times, it may be desirable to swing the gate to and from a closed position, without having the gate latch in a closed position. Such an operation may take place, for instance, when cattle are being sorted and let through the gate, one at a time. A filler 100 is attached by means of a chain 101 to the gate, and this filler may be placed within the space defined by the arm 16, the part 15 and the shank 14 of the latch, so as to prevent the side bar 8 of the keeper from engaging behind the arm 16.

Having concluded the description of what is old, and considering that which is new, it should be noted that, for reinforcement, the shank 14 of the latch is supplied with longitudinal ribs 50, there being a similar rib 51 on the head 15.

As a marked and more important improvement, a means is provided whereby the side bar 8 of the keeper 7 may be maintained in interlocked relation to the latch, behind the part 16, this means embodying a yoke 53, which may be denominated a guard, the yoke or guard straddling the shank 14 of the latch and comprising arms 54 and an end member 55 provided in its lower edge with inclined surfaces 56 defining a notch adapted to coact with the upper edge of the shank 14, the shank being beveled, as at 52, to coöperate with the notch. A pivot element 57 connects the arms 54 of the yoke 53, and is loosely mounted in an opening 58 in the shank 14.

When the side bar 8 of the keeper 7 passes behind the corresponding part 16 of the latch, the guard 53 is swung to one side, as shown in Fig. 4, one of the inclined surfaces 56 of the guard riding along the upper edge of the shank 14 of the latch. The guard has a compound movement, in that it not only swings laterally, but, as well, swings upwardly, and such a compound movement is possible, because the pivot element 57 is loosely received in the opening 58. When the guard 53 is swung to one side, by contact with the side bar 8 of the keeper, the side bar can, of course, engage behind the part 16. When the side bar 8 is free of the guard 53, the guard will slide downwardly and laterally and engage behind the part 8, owing to the function of the inclined surface 56. The guard is centered when the beveled portion 52 of the shank 14 is received in the apex of the notch formed by the inclined surfaces 56, and the end member 55 of the yoke prevents the element 8 from moving out of engagement with the part 16 of the latch, Fig. 2 being noted at this point.

I claim:—

1. In a device of the class described, a gate; a latch on the gate and comprising a shank and a head; a rotatably mounted keeper wherewith the head interlocks; and a guard pivoted to the shank and coacting with the head and the keeper to maintain them in interlocked relation.

2. In a device of the class described, a gate; a latch on the gate and comprising a shank and a head; a rotatably mounted keeper wherewith the head interlocks; and a guard pivoted to the shank for lateral movement to permit the head and the keeper to interlock, the guard having an inclined surface coöperating with the shank to restore the keeper to retaining position with respect to the keeper and the head thereby to maintain them in interlocked relation.

In testimony that I claim the foregoing as my own, I have hereto affixed my signature.

CHARLEY CLIFFTON ROSS.

Witnesses:
J. C. DYSANT,
HARRY A. NELSON.

Copies of this patent may be obtained for five cents each, by addressing the "Commissioner of Patents, Washington, D. C."